United States Patent [19]
Thorncraft et al.

[11] Patent Number: 5,011,252
[45] Date of Patent: Apr. 30, 1991

[54] FABRICATION OF FIBRE OPTIC COMPONENTS

[75] Inventors: David A. Thorncraft, Isabella Plains; David R. Kennedy, Kambah; Scott C. Rashleigh, Wanniassa; Timothy P. Dabbs, Eastwood, all of Australia

[73] Assignee: The Commonwealth of Australia, Canberra, Australia

[21] Appl. No.: 258,697

[22] PCT Filed: Nov. 9, 1987

[86] PCT No.: PCT/AU87/00374

§ 371 Date: Sep. 12, 1988

§ 102(e) Date: Sep. 12, 1988

[87] PCT Pub. No.: WO88/03660

PCT Pub. Date: May 19, 1988

[30] Foreign Application Priority Data

Nov. 14, 1986 [AU] Australia .............. PH8979/86

[51] Int. Cl.⁵ .................................................. G02B 6/26
[52] U.S. Cl. .................................. 350/96.15; 65/3.11; 350/96.20
[58] Field of Search ............ 350/96.15, 96.20; 65/3.11, 4.2, 4.21

[56] References Cited

U.S. PATENT DOCUMENTS

| | | | |
|---|---|---|---|
| 3,825,319 | 7/1974 | Cook et al. | 350/96 |
| 4,291,940 | 9/1981 | Kawasaki et al. | 350/96.15 |
| 4,336,047 | 6/1982 | Pavlopoulos | 350/96 |
| 4,377,403 | 3/1983 | McLandrich | 65/3.11 |
| 4,392,712 | 7/1983 | Ozeki | 350/96.16 |
| 4,400,055 | 8/1983 | Ozeki et al. | 350/96.16 |
| 4,410,346 | 10/1983 | Aulich | 65/4.2 |
| 4,426,215 | 1/1984 | Murphy | 65/4.21 |
| 4,439,221 | 3/1984 | Smyth et al. | 65/4.21 |
| 4,449,781 | 5/1984 | Lightstone | 350/96.15 |
| 4,536,058 | 8/1985 | Shaw | 350/96.15 |
| 4,565,558 | 1/1986 | Keil | 65/1 |
| 4,584,464 | 4/1986 | Myer | 219/354 |
| 4,586,784 | 5/1986 | Tremblay et al. | 350/96.15 |
| 4,591,372 | 5/1986 | Bricheno et al. | 65/4.2 |
| 4,612,028 | 9/1986 | Abebe et al. | 65/4.2 |
| 4,687,284 | 8/1987 | Rawson et al. | 350/96.15 |
| 4,755,037 | 7/1988 | Bjornlie | 350/96.15 |
| 4,756,589 | 7/1988 | Bricheno et al. | 350/96.15 |
| 4,763,272 | 8/1988 | McLandrich | 364/468 |
| 4,765,816 | 8/1988 | Bjornlie | 65/4.2 |
| 4,798,436 | 1/1989 | Mortimore | 350/96.15 |
| 4,801,185 | 1/1989 | Bricheno | 350/96.15 |
| 4,879,454 | 11/1989 | Gerdt | 350/96.20 X |

FOREIGN PATENT DOCUMENTS 2587502 3/1987 France .

OTHER PUBLICATIONS

"Multimode Directional Coupler Development", by Thorncraft et al., 10th Australian Conference on Optical Fibre Technology, 12/2-5/85, Perth Aust.

Primary Examiner—William L. Sikes
Assistant Examiner—Phan T. Heartney
Attorney, Agent, or Firm—Sterne, Kessler, Goldstein & Fox

[57] ABSTRACT

Apparatus for fabricating a fused biconical taper fibre optic coupler includes a hollow furnace (12) having a longitudinal slot (50). Clamp units (14, 16) are provided to hold at least two suitably prepared optical fibres (8, 9) in intimate side-by-side contact. The clamp units are moveable by motors (18, 20) to relatively laterally move the fibres into and out of the furnace (12) through the slot (50). A power supply (60) heats the furnace (12) to in turn heat segments of the fibres therein while these segments are in intimate side-by-side contact to a temperature sufficient to cause the fibre segments to fuse together. Drawings devices (22, 24) associated with the clamp units (14, 16) longitudinally draw the heated fibres while in the hot furnace to cause each fused fibre to develop a biconical taper and so form a coupler.

24 Claims, 8 Drawing Sheets

FABRICATION OF FIBRE OPTIC COMPONENTS

FIELD OF THE INVENTION

This invention relates to the fabrication of fused bionical taper fibre optic couplers and is concerned in particular with arrangements for heating intimately contacted optical fibre segments to fuse the segments together. The invention has general application to either single-moded or multi-moded fibres and couplers.

BACKGROUND ART

The usual technique for forming fused biconical taper fibre optic couplers entails disposing respective segments of two or more optical fibres in intimate side-by-side relationship and heating the segments to a temperature sufficient to cause the fibre segments to soften and fuse together. The heated fibres are then longitudinally drawn to cause each of the fused fibres to develop a biconical taper and to thereby form the coupler. A typical disclosure of these steps is to be found in U.S. Pat. No. 4612028 to Abebe.

Known means for effecting heating of the intimately contacted fibre segments include electrical resistance coils, the flames of gas microtorches, and electric arcs. Coils have generally been considered too slow in their heating and cooling rates, and lacking in adequate heat capacity, but flames are liable to cause significant physical damage to the delicate fibres, and also generate undesirable combustion coataminates unless special precautions are taken. For example, U S. Pat. No. 4,439,221 to Smyth et al discloses an improvement on these traditional heating arrangements in which the intimately contacted fibre segments are enclosed in the heating zone within a quartz tube. The fibres are threaded through the tube, which initially acts to protect the fibres and is heated by a flame and is said to thereby act as a furnace to distribute heat to the fibres. After drawing, the tube is retained as a protective packaging sleeve for the coupler.

Similar tubes, typically of quartz or glass and providing both protection and indirect heating, are described in other references. In some cases, the tube is fused into the coupler during heating; in others, it maintains a separate identity and is retained as a packaging sleeve. Australian patent application 46871/85 to Hitachi Ltd, for example, suggests heating the tube with an electric furnace or an oxyhydrogen flame but considers that the furnace is too slow. The reference discloses protective tubes of annular, semi-circular or U-shaped cross-section.

U.S. Pat. No. 4,377,403 to McLandrich discloses a coupler formed from single-mode fibres. The coupler is manufactured by etching the cladding over a given length, longitudinally twisting the fibres (three to ten turns over approximately two centimeters), and fusing the fibres by use of an electric arc. A sheath is placed around the etched, twisted, and fused fibres. A fluid having a refractive index closely matching that of the claddings of the fibres is introduced into the sheath and its ends plugged.

According to U.S. Pat. No. 4,392,712 to Ozeki, a group of optical fibres are placed in side-by-side contact, a quickly solidifying adhesive agent is applied at two positions along the fibres, and the glued fibres are fed into a fusing apparatus. This fusing apparatus comprises a hollow cylindrical heater (a coil of nichrome wire having an elliptical cross-section), clamps for the fibres, and runners driven by a stepping motor. The optical fibres are passed through the heater so that the lengths of the fibres between the two glued positions are located in the heater. The fibres are clamped, and then tightened so as to be straight by runners.

One set of fibre ends is coupled to light sources while the other set of fibre ends is coupled to photoelectric detectors. The heating is continued until the aformentioned portions are fused together. Fusion is measured by the photodetectors as a reduction in the light transmitted through the fibres. At this point, the runners start to move in opposite directions at 1 to 2 mm/sec. to elongate the heated fibre portions to create biconical taper sections. The elongation is continued until the difference in the output powers of the fibres as detected by the detectors is reduced to 0.5 dB.

A microtorch arrangement is disclosed in U.S. Pat. No. 4,591,372 to Bricheno.

It is considered by the present inventors that these prior heating arrangements, which were often developed for benchtop fabrication, are generally not well adapted to efficient, reproducible and reliable manufacture of fibre optic couplers on a mass production basis For example, with flame heating, there is practical difficulty in producing consistent flame characteristics such as temperature profile and temporal and spatial stability. Gas flow buffeting of fibres is also a problem. With an arc, it is extremely difficult to sufficiently control the spatial extent of the arc for coupler manufacture.

SUMMARY OF THE INVENTION

It is an object of the invention to provide a technique of fabricating fused bionical taper fibre optic couplers which is adaptable to mass production of couplers capable, if necessary with other process refinements, of at least meeting existing commercial standards and preferably of improving on them.

The invention accordingly provides a method of fabricating a fused biconical taper fibre optic coupler, comprising:

relatively laterally moving at least two suitably prepared optical fibres disposed side-by-side into a hollow furnace through a longitudinal slot in the furnace;

heating the furnace to in turn heat segments of the fibres therein while these segments are in intimate side-by-side contact to a temperature sufficient to cause the fibre segments to fuse together;

longitudinally drawing the heated fibres while in the hot furnace to cause each fused fibre to develop a biconical taper and so form a coupler; and relatively laterally removing the coupler from the furnace through said slot.

Said heating is preferably such as to be substantially axially symmetrical with respect to each fibre segment, and substantially uniform in either direction from a centre region of the contacted fibres.

The coupler is preferably removed from the furnace only after a rapid and controlled cooling thereof.

The invention further provides apparatus for fabricating a fused biconical taper fibre optic coupler, comprising:

a hollow furnace, preferably elongate, having a longitudinal slot;

means to hold at least two suitably prepared optical fibres in intimate side-by-side contact;

means to relatively laterally move the fibres into and out of said furnace through said slot;

means to heat the furnace to in turn heat segments of the fibres therein while these segments are in intimate side-by-side contact to a temperature sufficient to cause the fibre segments to fuse together; and means to longitudinally draw the heated fibres while in the hot furnace to cause each fused fibre to develop a biconical taper and so form a coupler.

The furnace may comprise a solid, generally tubular electrically resistive element of a material such as carbon, for example in the form of graphite, which heats when fed with electrical current. The furnace is preferably disposed within a body having an elongate slot co-planar with and in register with said longitudinal slot of the furnace.

The furnace is preferably of axially-symmetrical non-uniform cross-section along its axis, varying either continuously or in steps to provide, when an electric current is passed therethrough, a predetermined temperature profile within the hollow interior of the furnace.

The temperature profile of the furnace advantageously exhibits a single peak temperature zone in the central region of the furnace with steep downward gradients within a defined region greater than the central region. In use, the defined region includes the space in which the intimately contacted fibre segments reside.

The assembly preferably includes means for admitting a gas, for example an inert gas, to the interior of the furnace during said heating step. Where the furnace is a carbon furnace, in accordance with a preferred feature of the invention, provision may be made to periodically, for example but not necessarily before each fabrication of a coupler, to admit a suitable gas to the interior of the cavity for pyrolising the interior surface of the furnace. Methane is such a suitable gas: the purpose of pyrolisis, which cracks carbon from the gas onto the surface, is to stabilise the surface and thereby reduce the undesirable effects on coupler fabrication of the ageing of the element, so extending the useful life of the furnace.

The means to hold the optical fibres may comprise suitable releasable clamp means and the means to laterally move the fibres advantageously may include respective stepper motor lead screw drives for the clamp means. These clamps and said drawing means are preferably adapted to apply longitudinal tension to each fibre and are preferably associated with means to monitor the tension in one or both fibres.

Most preferably, the optical fibre segments are brought into said intimate contact by being twisted about each other, as is known in the art. The individual segments are advantageously initially under tension when being heated.

The optical fibres may be suitably prepared for the aforesaid method by, for example, one or more of stripping the protective coating, etching the cladding, and cleaning the stripped fibre.

In order to minimise sag during the fusing of the fibre segments, and thus to ensure that the fibres do not contact the interior surface(s) of the furnace, or the surfaces of adjacent features, the fibres may be longitudinally drawn at an initial rate slower than the rate at which the fibres are subsequently drawn to develop the biconical tapers.

This two stage drawing feature has more general application to other coupler fabrication methods and the invention accordingly further provides a method of manufacturing a fused biconical taper fibre optic coupler comprising:

heating respective segments of the fibres while these segments are in intimate side-by-side contact to a temperature sufficient to cause the fibre segments to fuse together;

longitudinally drawing the fibres at an initial slower rate while they are fusing together; and thereafter longitudinally drawing the heated fibres at a faster rate to cause each of the fused fibres to develop a biconical taper and so form a coupler.

The furnace temperature during the initial draw stage may also be different from that during the second draw stage.

The coupling factor of the coupler is preferably continuously monitored and the drawing rate changed as described in response to observation of a predetermined coupling factor, for example of a value between 1 and 5%, or after a predetermined time from initiation of the fusion process.

The invention still further provides apparatus for manufacturing a fused biconical taper fibre optic coupler comprising:

means to heat respective segments of the fibres while these segments are in intimate side-by-side contact to a temperature sufficient to cause the fibre segments to fuse together;

means to longitudinally draw the fibres; and means to control said drawing means so as to draw the fibres at an initial slower rate while they are fusing together, thereafter to draw the heated fibres at a faster rate to cause each of the fused fibres to develop a biconical taper, and so form a coupler.

This two stage drawing is to be contrasted with the drawing profile disclosed in Australian patent application 35650/84 to International Standard Electric Corporation which discloses an initial fast drawing rate effective to initiate and sustain biconical core formation, followed by at least one step down to a slower rate to facilitate better control of the final coupling parameters. A similar general drawing profile is disclosed in the aforementioned U.S. Pat. No. 4,592,372 to Bricheno.

BRIEF DESCRIPTION OF THE DRAWINGS

The invention will now be further described, by way of example only, with reference to the accompanying drawings, in which.

BEST MODES FOR CARRYING OUT THE INVENTION

Figure 1:
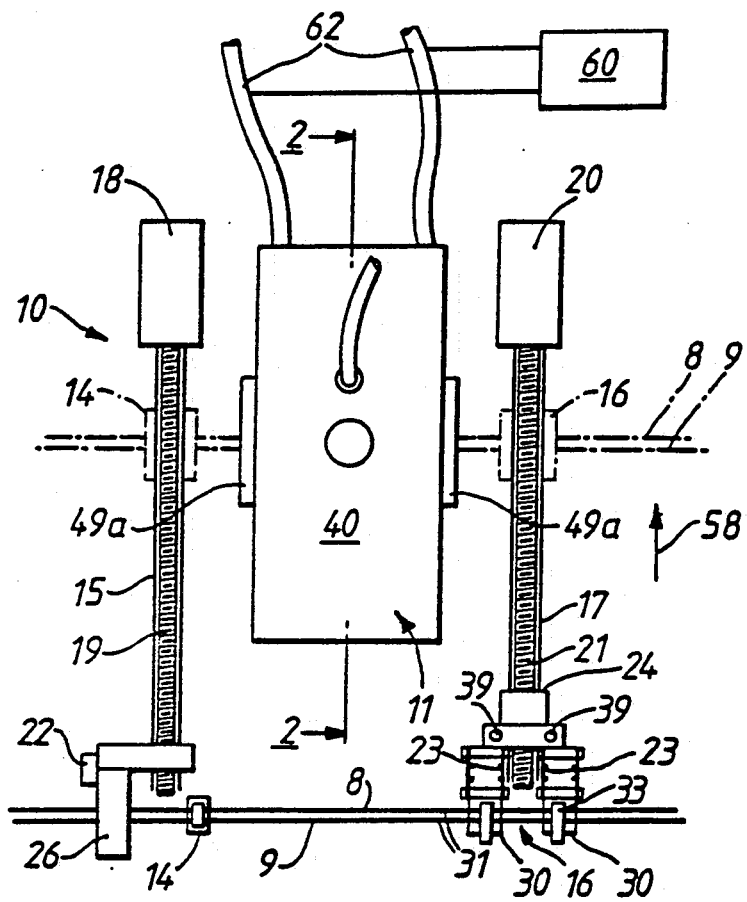
FIG. 1 is a purely schematic plan view of apparatus in accordance with the invention.

The illustrated apparatus 10 includes a heater assembly 11 with an elongate hollow tubular carbon furnace 12 (FIGS. 2, 3 and 4); respective translateable clamp units 14, 16 which are linearly moveable perpendicular to the axis of furnace 12 by lead screw drives 19, 21 on respective transverse slideways 15, 17; respective stepper motors 18, 20 operating the lead screw drives 19, 21; fibre drawing units 22, 24; devices 23 for measuring fibre tension; and a clamp rotater 26 associated with clamp unit 14.

Clamp units 14, 16, detailed further below, have respective platens 30, with grooves 31 which, in use of the apparatus, receive and locate a pair of optical fibres 8, 9, when they are extended between and securely held by the clamp units 14, 16, at an initial lateral spacing of 0.5 to 1.0 mm. The fibres are pressed and thereby clamped by hingeable padded plates 33. Clamp unit 14 is rotatable by drive 26 to subsequently twist the fibres about each other, for example, by one turn: clamps 14, 16 and drive 26 thereby constitute means to hold the fibres in intimate side-by-side contact. Drive 26 is designed to twist the fibres about each other without twisting the individual fibres, and is also detailed further below.

Drawing units 22, 24 are arranged to uniformly move clamp units 14, 16 oppositely away from each other parallel to the axis of furnace 12 and thereby serve to draw the fibres during the biconical formation step. They are employed to apply tension to the fibres during operation of the apparatus, in conjunction with tension monitoring devices 23 such as strain gauge bridges associated with clamp units 14, 16.

Figure 2:
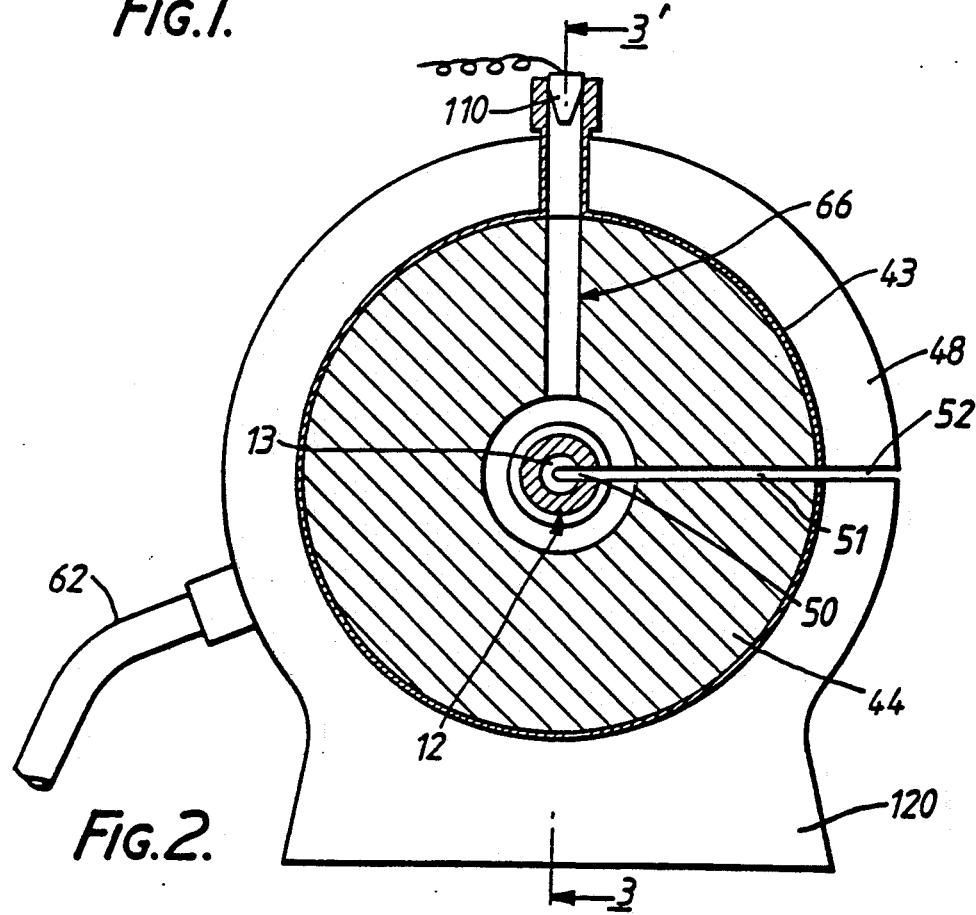
FIG. 2 is a lateral cross-section on the line 2—2 in FIG. 1, showing the greater assembly.
Figure 3:
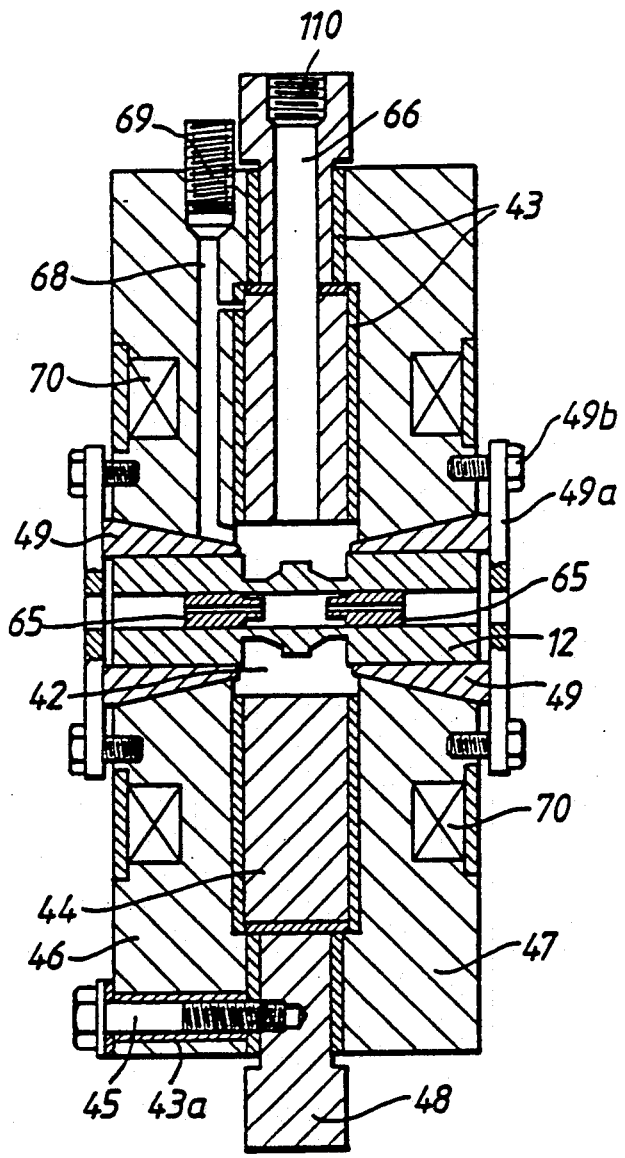
FIG. 3 is cross-section on the line 3—3 in FIG. 2 and depicts the furnace in greater detail.
Figure 4:
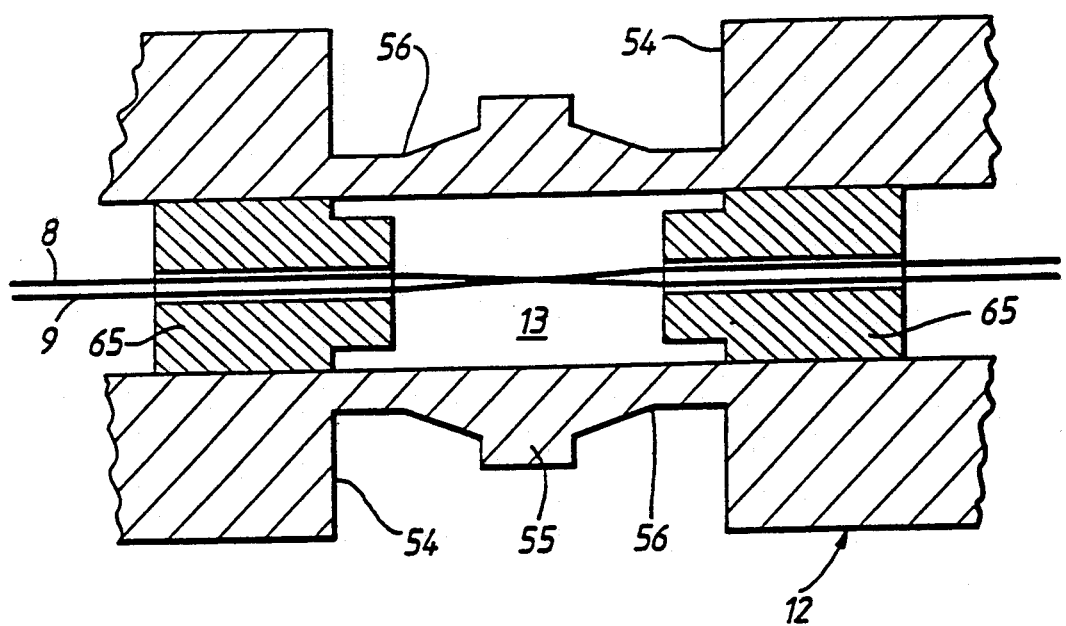
FIG. 4 is an enlarged axial cross-sectional view of the furnace.

Heater assembly 11 is illustrated in greater detail in FIGS. 2 to 4. It includes a housing 40 comprised of four principal parts: an annular heat insulating core 44, e.g. of graphite felt, a pair of larger annular electrodes 46, 47, and an outer mounting ring 48. Ring 48 extends about core 44, both being sandwiched between electrodes 46, 47, and is shaped to provide a stable pedestal 120 for the assembly (FIG. 2). This assembly is maintained by multiple screws 45 fastening the electrodes to ring 48, and the electrodes are wholly electrically insulated from each other, the core and the ring by suitable insulating shims and baffles 43, and by insulating sleeves 43a about screws 45.

Housing 40 defines at its centre a cavity 42 which receives furnace 12. The bores of electrodes 46, 47 are inwardly tapered to complement respective concical electrically conductive copper wedges 49 which firmly fix the furnace axially symmetrically in place. Wedges 49 are driven home and retained by end plates 49a held by screws 49b to the electrodes. Wedges 49 allow for thermal expansion of the furnace during heating.

Carbon furnace 12, a tube of solid and homogeneous graphite, is heated by an electrical current delivered from a suitable power supply 60 via the sheaths of coolant supply conduits 62. The current passes via one electrode 46 through the associated wedge 49, the furnace 12, the other wedge 49 and electrode 47.

The axis of furnace 12 is advantageously horizontal, as illustrated, rather than vertical, to prevent a "chimney" effect and consequent undesirable deposition of particles and other contaminants on the fibres.

The hollow interior cavity 13 of furnace 12 is of axially symmetrical circular cross-section and is laterally open to the space between clamp units 14, 16 by registered Co-planar longitudinal slots 50, 51, 52 (FIG. 2) respectively in the furnace, in insulating core 44, and in the outer mounting ring 48. Cavity 13 is furthermore open ended and registers with apertures in end plates 49a so that there is a clear axial line of sight through the heater assembly.

Figure 5:
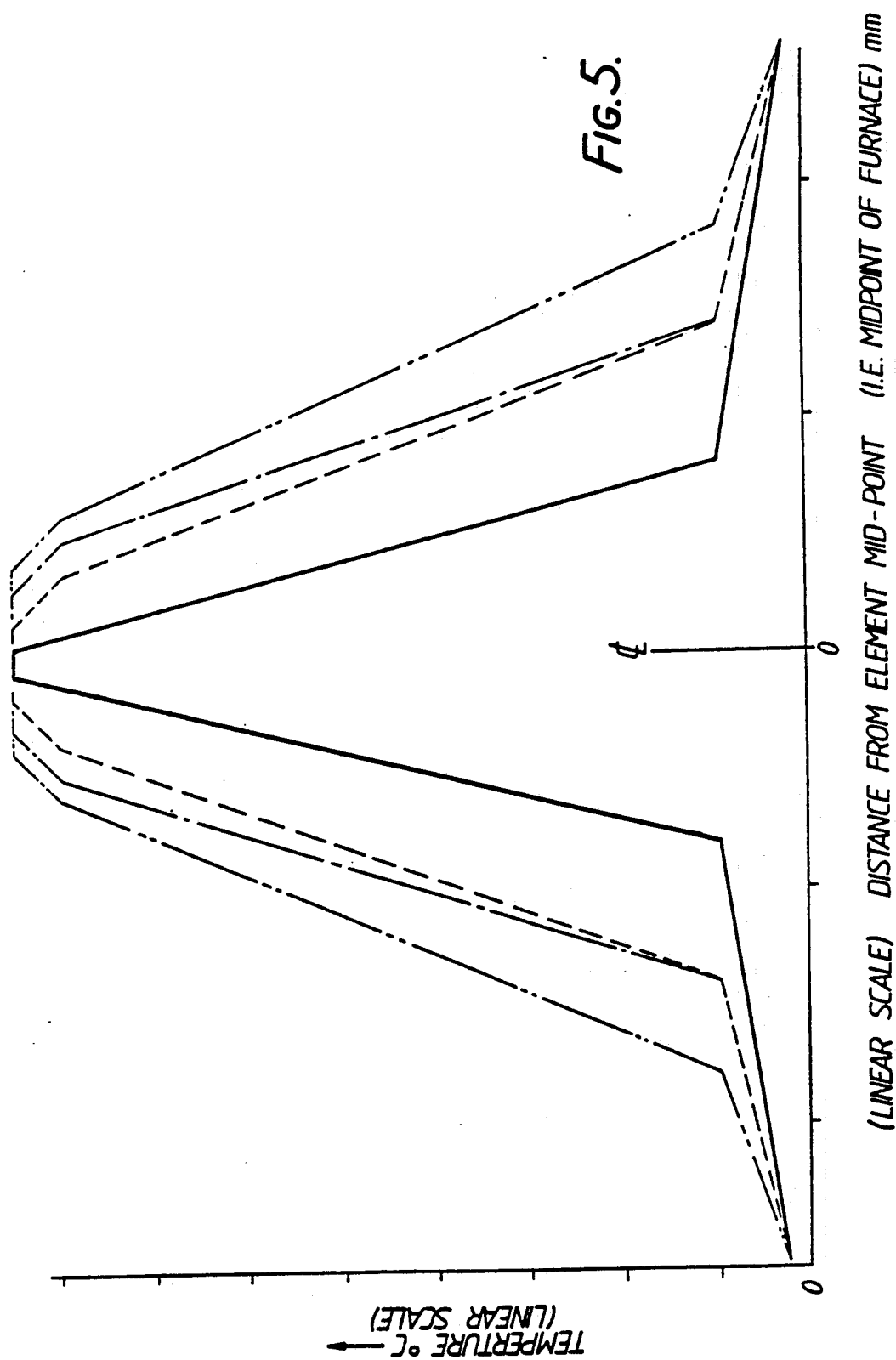
FIG. 5 shows several exemplary temperature profiles for the hollow interior of the furnace component of the heater assembly.

Furnace 12 has a temperature profile in its internal cavity 13 that is substantially both axially symmetrical and longitudinally symmetrical about a centre point. More particularly in this case, the furnace is externally biconically tapered (best seen in FIG. 4) by steps or shoulders 54 defining enlarged ends and a central bulge 55 separated by spaced waists 56 so that the temperature profile of the hollow interior exhibits a single peak temperature zone in the centre region of the furnace with steep downward gradients within a defined region greater than the centre region. Several exemplary such longitudinal profiles are shown in FIG. 5. Other furnace shapes will achieve a temperature profile of this general form but the shape shown is especially effective. The separation of shoulders 54 is preferably between 10 and 20 mm, eg about 15 mm. The diameter of cavity 13 is preferably between 4 and 8 mm, eg about 6mm. The bulge 55 ensures a flat-top profile, which is preferred to minimise undesirable coupler cross-sectional changes along the length of the tapers and waist, and the steepness of the gradients may be further enhanced by locating laterally slotted graphite plugs 65 in the bore of the furnace, to either side of the waists 56.

Assembly 11 has a transverse bore 66 to locate a pyrometer 110 (FIG. 2) to monitor the temperature of furnace 12, as well as a duct 68 and port 69 for admitting a gas, for example an inert gas such as nitrogen, to cavity 42 and to the interior cavity 13 of the furnace during the heating and drawing steps. This gas is necessary for optimum operation of the graphite furnace, and may be periodically replaced as described above, by a gas such as methane for pyrolising the interior surface of the furnace. Electrodes 46, 47 are provided with internal coolant tubes, represented at 70, to which coolant is circulated via conduits 62.

Figure 6:
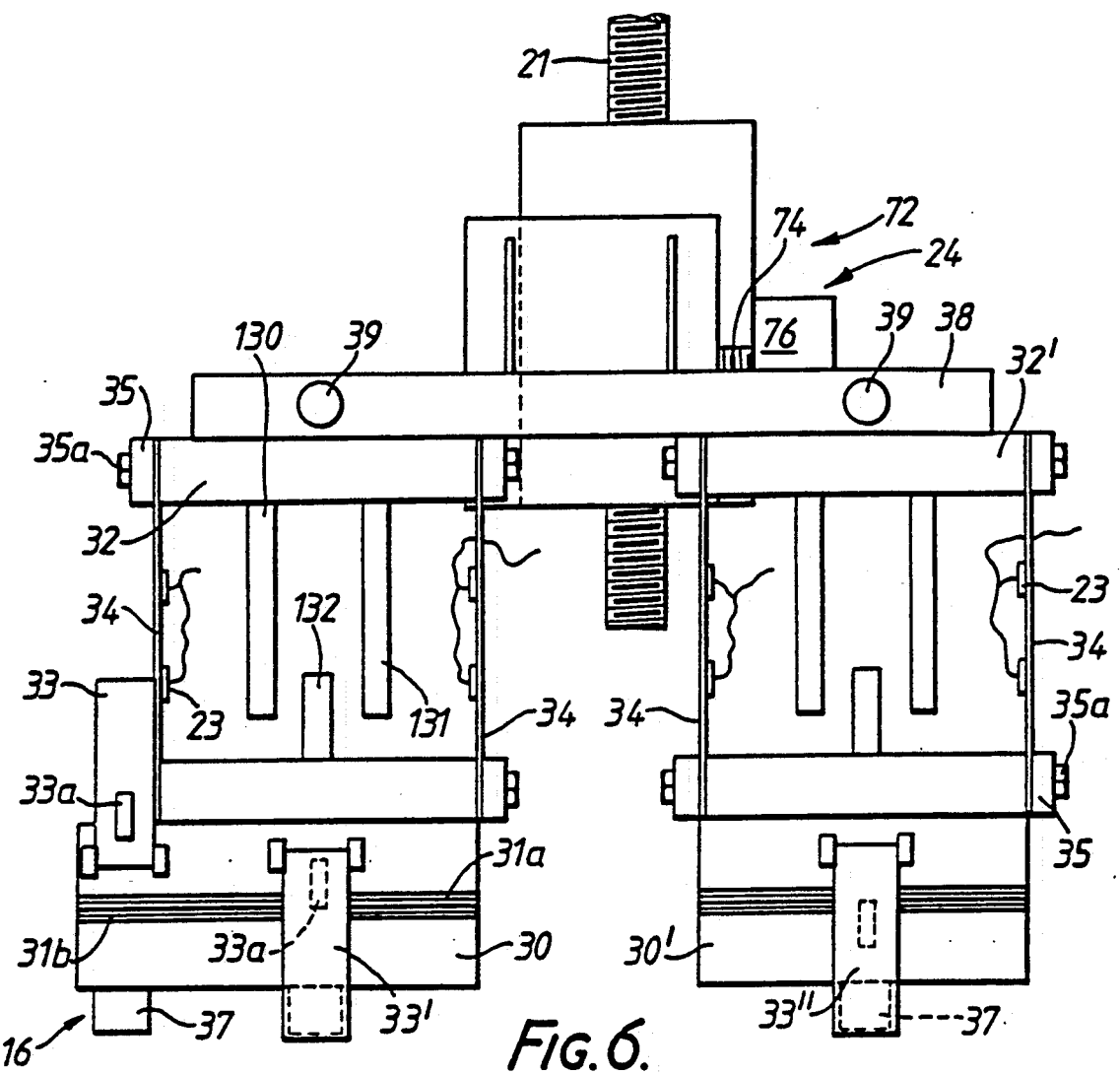
FIG. 6 is a plan view of the unit for clamping, tensioning and drawing the optical fibres.
Figure 7:
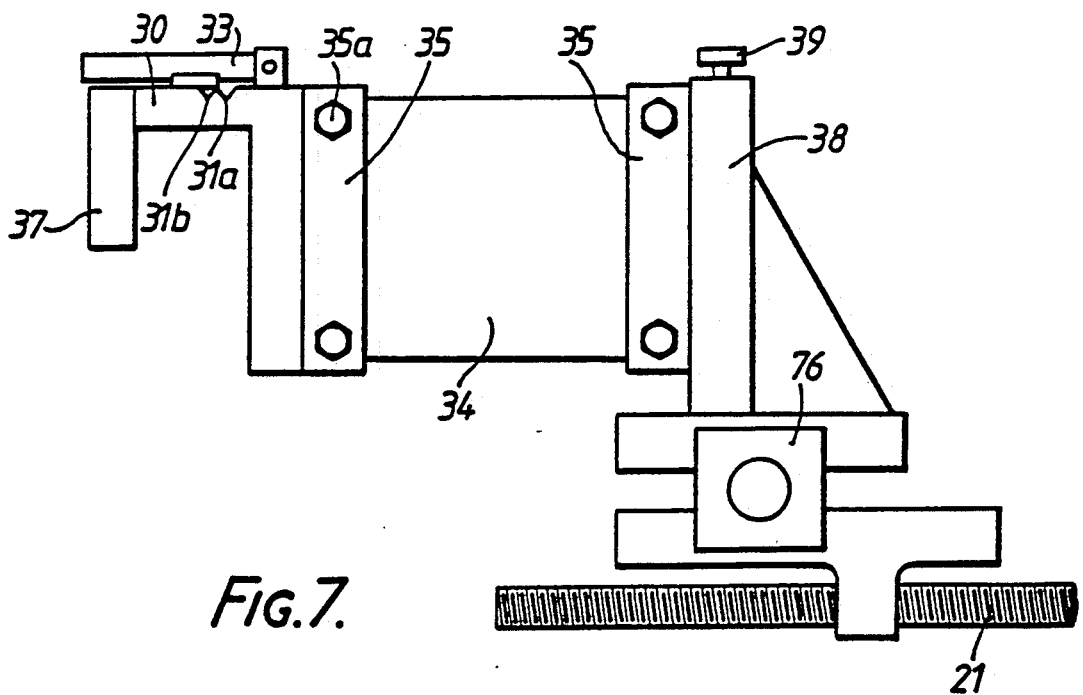
FIG. 7 is a side elevation of the unit of FIG. 6.

Clamp unit 16 is depicted in greater detail in FIGS. 6 and 7. A pair of platens 30, 30' with fibre grooves 31a, 31b are secured to respective mounting blocks 32, 32' by pairs of stainless steel Shims 34. Shims 34 are held by cover strips 35 and screws 35a. Shims 34 are in vertical planes and carry the aforementioned strain gauge devices 23. Limits on the movement of platen 30 are provided by projecting detents 130, 131 on blocks 32, which engage an outstanding lug 132 on the platen.

Three hingeable padded steel plates 33, 33' and 33" are provided on platens 30, 30'. The pads 33a are positioned on the undersides of plates 33, 33' and 33" so that they respectively clamp both fibres and the two fibres separately. Plates 33, 33' and 33" are retained against the fibres by magnets 37. Fibre grooves 31a, 31b are V-grooves dimensioned to leave about half the fibre cross-section above the surface of the platen.

Blocks 32, 32' are mounted on a common backplate 38 for sliding movement parallel to the fibre direction. These sliding motions are effected by rotation of finger knobs 39 and are used to individually tension, or adjust the tension of, the respective fibres. The backplate 38 is part of a carriage 72 which is moveable uniformly on a lead screw 74 parallel to the fibres and on lead screw 21 perpendicular to the fibres. Lead screw 74 is driven by a motor 76 and these components thereby constitute drawing unit 24.

Figure 8:
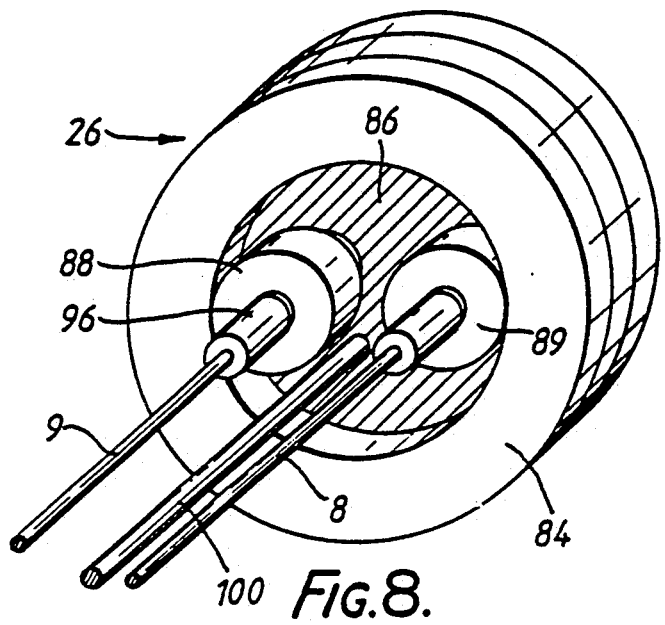
FIG. 8 is an isometric view of the gearing of the unit for clamping the fibres and twisting them about each other.
Figure 9:
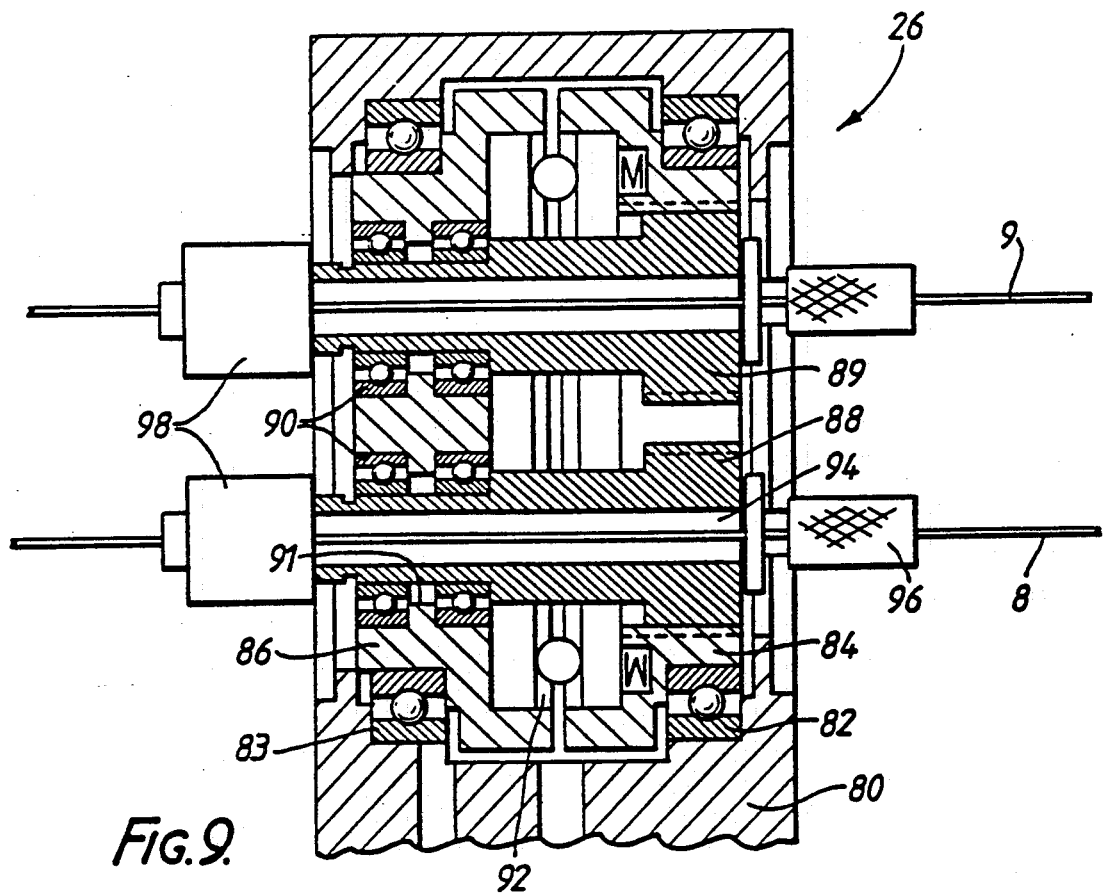
FIG. 9 is an axial cross-section of the unit containing the gearing shown in FIG. 8.

FIGS. 8 and 9 show rotater 26 in greater detail. An annular housing 80 has bearings 82, 83 for a front internally toothed ring gear 84 and a rear large spur gear 86 of similar outer diameter. A pair of planetary gears 88, 89 are rotatably supported by bearings 90 in apertures 91 in gear 86, and mesh with ring gear 84. Gears 84, 86 are relatively supported by a ball rack 92. Planetary gears 88, 89 have axial bores 94 through which the respective fibres 8, 9 may be threaded and gripped by collets or chucks 96 at the front of the planetary gears. Slipping clutches 98 are provided at the rear Spur gear 86 also mounts a forwardly projecting rod 100 which carries clamp platen 30''' at its other end Each of gears 84, 86 is driven independently by its own stepping motor (not shown) which is adjustable under computer control so that as the gear 86 rotates to twist the fibres about each other, the planetary gears are driven by ring gear 84 to precisely counter the resultant torsion on the individual fibres so that there is no net twisting of each fibre. If desired, of course, the mechanism may be set to obtain a desired non-zero amount of fibre twist.

In use of the apparatus to fabricate a fused biconical taper fibre optic coupler, a pair of optical fibres 8, 9, for example multi-mode silica fibres of selected length with a germanium-doped core, are first stripped of their coating in respective segments to expose the cladding. The cladding is preferably etched by any suitable well know technique to reduce the cladding thickness in all or part of these segments. The fibres are then cleaned, for example, in a methanol bath or sponge, and securely held under prescribed balanced tension by clamp units 14, 16 as shown in FIG. 1, in front of and in line with slot 52, and twisted together (by typically one turn, but there may be more, for example up to four turns) by rotating clamp 14 with drive 26 to place them in intimate side-by-side contact. Clamp unit 16 facilitates the accurate mounting of each fibre at the desired tension.

Stepper motors 18, 20 are then activated to rotate lead screws 19, 21 and thereby move clamps 14, 16 at equal speeds in slideways 15, 17, in the direction indicated by arrow 58, to move the intimately contacted fibres through slots 52, 51, 50 to the centre of furnace cavity 13. This position is shown by dot-dash lines in FIG. 1: the centre of the contacted/twisted segments of the fibres should desirably be at the centre of the longitudinal temperature profile of the furnace cavity. Power supply 60 is then activated to heat the initially tensioned, etched and contacted fibre segments to a temperature sufficient to cause the fibre segments to soften and fuse together in a manner well known per se, over a fusion length of, or example, about 1 cm. The temperature required is in excess of 1600° C.

Drawing units 22, 24 are activated during the fusion step to draw the fibres in opposite directions at a relatively slow rate, for example 1 to 4 mm per minute with a 1 cm fusion length, to minimise sag sufficiently to preclude the optical fibres from contacting the surface of furnace cavity 13 or other adjacent features. Strain gauge devices 23 are employed to ensure that adequate fibre tension is maintained.

During this process, light is preferably being transmitted through one of the optical fibres from one end, and monitored at the other end of each fibre. It is then possible to continuously monitor the coupling factor and excess power loss. When the coupling factor is observed to reach, for example about 2%, fusion is deemed to be complete and the drawing rate is increased substantially, for example to 7 or 8 mm per minute: this is effective to cause the fused fibres to develop a biconical taper in the known fashion. Heating and drawing are stopped in a controlled fashion in order to achieve the desired coupling factor. Typically the waist of the coupler will be 30 microns wide for original etched fibres of diameter 80 to 90 microns each. During the faster draw, it may be desirable to lower the furnace temperature. The biconical taper coupler can now be packaged and/or encapsulated in accordance with techniques known per se to render it resistant to hostile environments, as well as robust and shock resistant.

Figure 10:
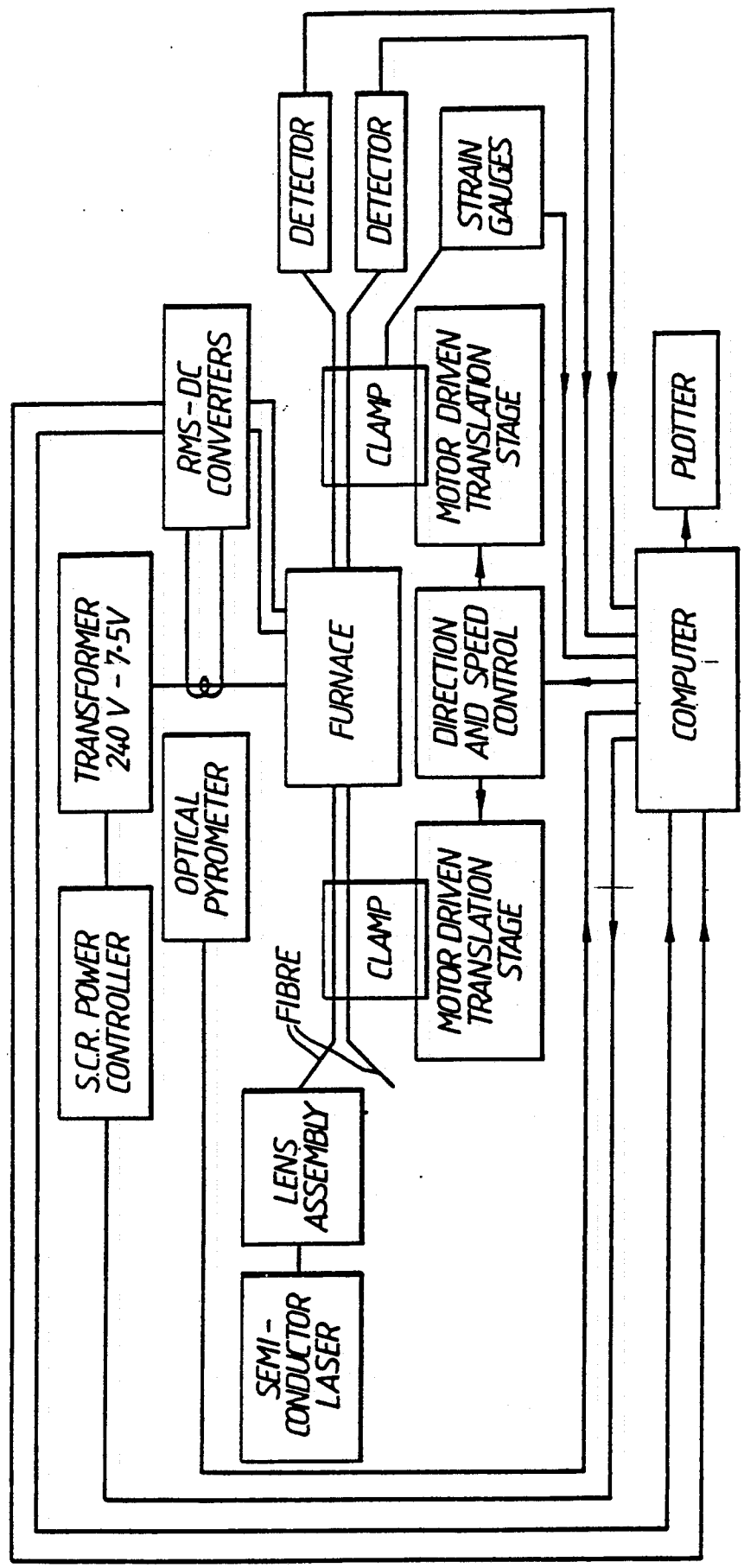
FIG. 10 is a block diagram of the computer control arrangement for the apparatus of FIG. 1.

FIG. 10 is a block diagram of a computer-controlled arrangement for carrying out the above steps wholly automatically once the fibres are clamped in place. A particular task for the computer is to apply the two-stage drawing profile which is a notable preferred feature of the invention.

Figure 11:
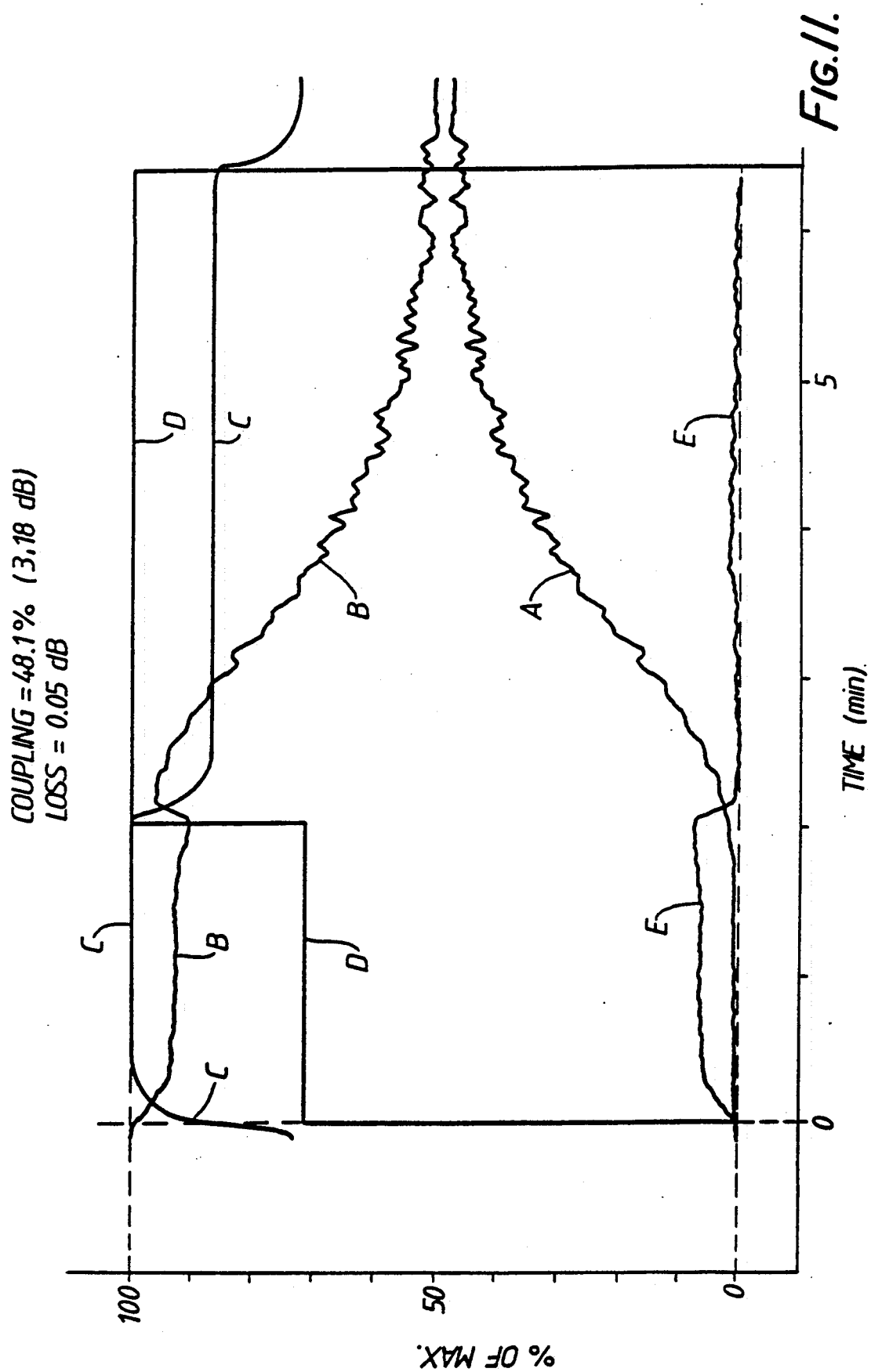
FIG. 11 is a graphical representation depicting changes with time of various parameters of the described method, when utilised to manufacture a multimode coupler.

FIG. 11 demonstrates the later stages of the process when fabricating a coupler in the manner just described from cladding-etched multi-mode optical fibres. The desired coupling factor was 50% and achieved at 48%. Curves A, B are the respective optical power outputs from the end of the fibres mentioned above, monitored from an arbitrary starting time shortly before maximum furnace temperature (curve C) was reached. Curve D is the drawing rate and curve E the measured power loss at the coupler.

This graph also serves to highlight the advantageous results of the invention. The total time taken from commencement of heating for fusion to cut off is only about 6½ minutes, the fluctuation in the coupling factor is small, and the measured power loss is a very low 0.05 dB.

It is found that the technique of the invention allows an operator to more repeatedly produce standard couplers which meet given standards of insertion loss, tolerance in coupling factor, reflection co-efficient and directivity. Usually, it is desirable to minimise these parameters but there are occasions when it may be of interest to produce a more complex coupler having particular performance characteristics with respect to changes in wave length for example: the inventive method and apparatus affords the control necessary to achieve such performance.

The best commercial multi mode couplers currently available and known to the present inventors exhibit insertion losses of the order of 0.3dB and, for example, tolerances of x5% for rated coupling factors of 50%. The best commercial single-mode couplers exhibit losses of about 0.1dB. The inventive method is capable of achieving losses of about 0.1dB for the multi-mode case, and coupling factor tolerances of the order of ±2% with satisfactory reproducibility.

The method of the invention utilising a furnace provides good control over the subsequent polarisation sensitivity of a single-mode coupler through control over the coupler cross-section. By virtue of the invention, it is possible to control heating and thus fusion to minimise polarisation sensitivity, or to control it at a desired level. In multi-mode couplers, fine control of the fused region by the furnace minimises undesired asymmetric behaviour towards input signals or facilitates control to obtain a desired asymmetric behaviour.

It is to be noted that the rate at which the furnace, and the fibres, are heated may be up to several hundred degrees celsius or more. This is a significant improvement on the performance of prior manufacturing methods.

The method and apparatus of the invention constitute a very simple, reliable and efficient arrangement for fabricating a fibre optic coupler. The arrangement is moreover readily adapted to mass production techniques.

We claim:

1. Apparatus for fabricating a fused biconical taper fibre optic coupler, comprising:
   a hollow furnace having a longitudinal slot;
   means to hold at least to suitably prepared optical fibres in intimate side-by-side contact;
   means to relatively laterally move the fibres into and out of said furnace through said slot;
   means to heat the furnace to in turn heat segments of the fibres therein while these segments are in intimate side-by-side contact to a temperature sufficient to cause the fibre segments to fuse together; and
   means to longitudinally draw the heated fibres while in the hot furnace to cause each fused fibre to develop a biconical taper and so form a coupler.

2. Apparatus according to claim 1 wherein said furnace comprises a solid, generally tubular electrically resistive element of a material which heats when fed with electrical current.

3. Apparatus according to claim 2 wherein said furnace material is carbon.

4. Apparatus according to claim 1, 2 or 3 wherein said furnace is disposed within a body having an elongate slot co-planar with and in register with said longitudinal slot of the furnace.

5. Apparatus according to claim 4 wherein said furnace is held within a bore in said body by a pair of electrically conductive conical wedges clamped between the respective ends of the furnace and respective mutually electrically insulated annular electrodes through which electrical current flows to and from said furnace.

6. Apparatus according to claims 1, 2 or 3 where said furnace is of axially symmetrical non-uniform cross-section along its axis, varying either continuously or in steps, to provide when an electric current is passed therethrough, a predetermined temperature profile within the hollow interior of the furnace.

7. Apparatus according to claim 6 wherein said furnace has a central segment of reduced cross-section relative to respective segments to either axial side, whereby the temperature profile exhibits a single peak temperature zone in the central region of the furnace with steep gradients within a defined region greater than the central region.

8. Apparatus accordingly to claims 1, 2 or 3 further including means for admitting a gas to the interior of the furnace during said heating step.

9. Apparatus according to claims 1, 2 or 3 wherein said means to hold the optical fibres comprises releasable clamp means and the means to laterally move the fibres includes respective lead screw drivers for the clamp means.

10. Apparatus according to claim 9 wherein said clamp means and said drawing means are adapted to apply longitudinal tension to each fibre and are associated with means to monitor the tension in one or more of the fibres.

11. Apparatus according to claim 9 wherein said clamp means and drawing means includes a pair of clamps mounted to a carriage assembly which is translatable on the one hand by said lead screw drives and on the other longitudinally draw the heated fibres.

12. Apparatus according to claim 9, wherein said clamp means comprises a platen with grooves to locate the respective fibres and one or more plates hingeable to press the fibres and retainable in such a position by a magnet.

13. Apparatus according to claims 1, 2 or 3 further including means to bring the optical fibre segments into said intimate contact by twisting the fibres about each other.

14. Apparatus according to claim 13 wherein said twisting means comprises a pair of planetary gears with bores to receive the fibres and an associated geared drive to revolve the planetary gears to twist the fibres about each other without twisting the individual fibres.

15. A method of fabricating a fused biconical taper fibre optic coupler comprising:
   relatively laterally moving at least two suitably prepared optical fibres disposed side-by-side into a hollow furnace through a longitudinal slot in the furnace;
   heating the furnace to in turn heat segments of the fibres therein while these segments are in intimate side-by-side contact to a temperature sufficient to cause the fibre segments to fuse together;
   longitudinally drawing the heated fibres while in the hot furnace to cause each fused fibre to develop a biconical taper and so form a coupler; and
   relatively laterally removing the coupler from the furnace through said slot.

16. A method according to claim 15 wherein said heating is such as to be substantially axially symmetrical with respect to each fibre segment, and substantially uniform in either direction from a centre region of the contacted fibres.

17. A method according to claim 15 or 16 wherein the coupler is removed from the furnace only after a rapid and controlled cooling thereof.

18. A method according to claim 15, or claim 16 wherein said heating is effected by a furnace temperature profile which exhibits a single peak temperature zone in the central region of the furnace with steep downward gradients within a defined region greater than the central region.

19. A method according to claim 15 or claim 16 wherein said optical fibre segments are brought into said intimate side-by-side contact by twisting the fibres about each other.

20. A method according to claim 15 or claim 16 wherein, while said fibre segments are fusing together, the fibres are drawn at an initial rate slower than the rate at which the fibres are subsequently drawn to develop the biconical tapers.

21. A method of manufacturing a fused biconical taper fibre optic coupler comprising:
   heating respective segments of the fibres while these segments are in intimate side-by-side contact to a temperature sufficient to cause the fibre segments to fuse together;
   longitudinally drawing the fibres at an initial slower rate while they are fusing together; and thereafter longitudinally drawing the heated fibres at a faster rate to cause each of the fused fibres to develop a biconical taper and so form a coupler.

22. A method according to claim 21 wherein the coupling factor of the coupler is continuously monitored and the drawing rate changed as described in response to observation of a predetermined coupling factor.

23. Apparatus for manufacturing a fused biconical taper fibre optic coupler comprising:

means to heat respective segments of the fibres while these segments are in intimate side-by-side contact to a temperature sufficient to cause the fibre segments to fuse together;

means to longitudinally draw the fibres; and means to control said drawing means so as to draw the fibres at an initial slower rate while they are fusing together; and thereafter to draw the heated fibres at a faster rate to cause each of the fused fibres to develop a biconical taper and so form a coupler.

24. Apparatus according to claim 1, 2 or 3 wherein the hollow furnace and its slot extend substantially horizontally.

* * * * *